United States Patent Office 3,758,383
Patented Sept. 11, 1973

3,758,383
PRODUCTION OF EXOTOXIN OF
BACILLUS THURINGIENSIS
Tsuong R. Shieh, Bannockburn, and Martin H. Rogoff, Highland Park, Ill., assignors to International Minerals & Chemical Corporation, Libertyville, Ill.
No Drawing. Filed June 1, 1971, Ser. No. 149,079
Int. Cl. C12d 7/00
U.S. Cl. 195—96                                                                                       15 Claims

ABSTRACT OF THE DISCLOSURE

Method for the production of the exotoxin of *Bacillus thuringiensis* in high yield using a high carbohydrate medium and an acrystalliferous mutant of *Bacillus thuringiensis* var. *thuringiensis*.

BACKGROUND OF THE INVENTION

*Bacillus thuringiensis*, a spore-forming microorganism with crystalline parasporal bodies, has been employed commercially as a microbial insecticide for the control of insects such as species of the order Lepidoptera and certain flies and mites. *B. thuringiensis* and its use as an insect pathogen is described, inter alia, in C. L. Hannay and P. Fitz-James, "The Protein Crystals of *Bacillus thuringiensis* Berliner," Can. J. Microb., I, 694–710 (1955); A. H. Heimpel, "A Critical Review of *Bacillus thuringiensis* var. *thuringiensis* Berliner and Other Crystalliferous Bacteria," Ann. Rev. Entomology, 12, 287–322 (1967). *B. thuringiensis* insecticides are quite specific and are entirely harmless to non-susceptible orders of insects, animals and man.

"Endotoxin" is used by the art to define the toxicity associated with the water-insoluble crystals. "Exotoxin" denotes the so-called heat-stable, water-soluble fly toxin produced by *Bacillus thuringiensis* var. *thuringiensis* organisms. As might be expected, the capacity for toxin production and, therefore, insecticide effectiveness varies among strains of *B. thuringiensis*. As a consequence, the selection of either highly effective strains or strains having any desired toxicity in relation to cell weight has involved totally random screening techniques. The water-soluble, heat-stable exotoxin was first reported in 1959 when its toxicity against the larva of flies was noted. A comprehensive review of the heat-stable exotoxin is contained in the previously mentioned article by A. M. Heimpel. This article summarizes the activity of the exotoxin (therein referred to as *B.t.-β* exotoxin) and concludes that exotoxin is effective against insects belonging to some species of the orders "Lepidoptera, Diptera, Hymenoptera, Coleoptera, and Orthoptera." It is also reported that the exotoxin affects insects only at molting or during metamorphosis.

The probable chemical structure of *Bacillus thuringiensis* exotoxin has been elucidated by Bond et al., "A Purification and Some Properties of an Insecticidal Exotoxin from *Bacillus thuringiensis* Berliner," R. P. M. Bond, C. B. C. Boyce and S. J. French, Biochem. J. (1969), 114, 477–488.

The proposed structure is:

$$\begin{array}{c} CO_2H \\ HO-H \\ H_2PO_3-O-H \\ HO-H \\ O-H \\ CO_2H \end{array}$$

(with attached sugar and adenine-like heterocyclic moieties, $NH_2$, $HO \cdot CH_2$, $OH$ groups as shown)

Bond et al. have also proposed a chromatographic analytical method which is suitable for determining the quantity of exotoxin in supernatant liquid separated from the final whole culture. The analytical results hereinafter reported were obtained essentially by this method.

DESCRIPTION OF THE INVENTION

Briefly, this invention relates to a method for the production of *Bacillus thuringiensis* exotoxin in which an acrystalliferous mutant of a *Bacillus thuringiensis* var. *thuringiensis* is cultured in a nutritionally sufficient aqueous medium containing carbohydrate in an amount sufficient to suppress sporulation over a period of at least 48 hours. The culture is maintained at a temperature in the range of 20° to 40° C. and at a pH in the range of 6 to 8 for a period of at least 40 hours and an exotoxin-containing product is recovered.

It has been found that by the process of this invention unusually high yields of exotoxin are obtainable. By "suppressing sporulation" it is meant that the number of spores produced is less than $10^9$ per ml. of medium, and preferably less than $10^8$ spores per ml. This will represent generally less than 1% sporulation. As a further significant aspect of the invention, casein is used as the principal protein source with the result that exotoxin recoveries are substantially enhanced.

In carrying out the process of the invention, a selected mutant of an acrystalliferous *Bacillus thuringiensis* var.

*thuringiensis* is cultured in a nutritionally adequate medium. A specifically preferred medium is as follows:

| | Percent |
|---|---|
| Sucrose | 10 |
| Technical casein | 5 |
| Corn steep liquor | 1 |
| $(NH_4)_2HPO_4$ | 0.2 |
| $MgSO_4 \cdot 7H_2O$ | 0.05 |
| $FeSO_4$ | 0.001 |
| $MnCl_2$ | 0.001 |

Considerable variation in the medium is possible. It has been found that suppression of sporulation is obtained at relatively high carbohydrate levels, particularly in the presence of technical casein. Accordingly, carbohydrate, preferably in the form of sucrose or starch, in the amount of 6% to 12% by weight of the medium, is employed. Advantageously, technical casein in the amount of 2 to 6% of the medium, and more preferably, about 5% of the medium, is employed. Glutamic acid and its alkali metal salts may be used in place of casein, especially if a wholly synthetic medium is desired. In any case, the carbohydrate level must be sufficient to suppress sporulation to below $10^9$ spores/ml., and more preferably below $10^8$ spores/ml. for a period of at least 48 hours, and more preferably for a period of 64 hours.

The fermentation is carried out at a pH in the range of 6 to 8 and at a temperature in the range of 20 to 40° C. The fermentation is preferably carried out for a period of 40 to 60 hours.

A strain of *Bacillus thuringiensis* var. *thuringiensis*, hereinafter designated A, and having the following key characteristics, can be obtained from the Northern Utilization Research and Development Division, United States Department of Agriculture, Peoria, Ill., U.S.A. Its Accession Number in this repository is NRRL B-3936.

TABLE 1

| | |
|---|---|
| Acetylmethylcarbinol | + |
| Lecithinase | + |
| Salicin | + |
| Protiolysis | + |
| Pigment | − |
| Sucrose | + |
| Pellicle | + |
| Urease | − |
| Esculin | +++ |
| Mannose | + |
| Starch | ++ |
| Cellobiose | + |
| Phospholipae C | + |
| Trehalose | + |
| Levulose | + |
| Glucose | + |
| H-antigen | I |
| Esterase | I |
| Heat-stable fly toxin | + |
| Crystal toxicity silkworm | + |

A *Bacillus thuringiensis* var. *thuringiensis* Strain A cell suspension was grown on a nutrient broth and treated with 2 to 10 μg./ml. of mitomycin C and 20 μg./ml. acridine orange. An isolate designated B was found to be an acrystalliferous mutant. By this it is meant that no crystal was formed when the mutant was cultured without stress, i.e., in a nutritionally sufficient medium containing 2% sucrose as the sole carbohydrate source. This isolate B can also be obtained from the Northern Utilization Research and Development Division, United States Department of Agriculture, Peoria, Ill., U.S.A. Its Accession Number in this repository is NRRL B-3937.

The following examples compare the characteristics of organism A and mutant organism B, and further establish the unusually high yields attainable with organism B. In carrying out each of the following experiments an inoculum was transferred to a nutrient broth slant and then again transferred to 1% sucrose-yeast extract broth in th amount of 50 mm. in a 200 mm. flask. The inoculant was cultured at a temperature of 20 to 35° C. and at a pH of 6 to 8 for an incubation period of 40 hours on a rotary shaker. Medium for the principal fermentation in the amount of 100 ml. in a 500 ml. shaker flask was employed.

Example I

B.t. Strain A and Mutant B were grown in a medium containing:

| | Percent |
|---|---|
| $(NH_4)_2HPO_4$ | 1.0 |
| Corn steep liquor | 1.0 |
| Fish meal | 4.0 | and various contents of sucrose.

After 64 hours fermentation, spore count, exotoxin content, and crystal formation were examined.

| | Sucrose, percent | Spores/ml. $\times 10^9$ | Exotoxin, mg./ml. | Crystal formation |
|---|---|---|---|---|
| Organism: | | | | |
| A | 2 | 6.6 | 2.76 | + |
| A | 8 | 0.27 | 3.96 | − |
| B | 2 | 2.6 | 2.64 | − |
| B | 8 | 0.75 | 5.06 | − |

Result shows that high concentration of sucrose results in little sporulation and crystal formation, but with the accumulation of a higher level of exotoxin; and that the acrystalliferous mutant produces higher exotoxin yield when sporulation was suppressed using addition of 8% sucrose.

Example II

Example I was repeated except that 4% technical casein was used in place of fish meal.

| | Sucrose, percent | Spores/ml. $\times 10^7$ | Exotoxin, mg./ml. |
|---|---|---|---|
| Organism: | | | |
| B | 2 | <0.5 | 4.32 |
| B | 8 | <5.0 | 7.44 |

This result shows technical casein suppresses sporulation and increases the exotoxin yield. It also indicates that high sucrose content is necessary for higher exotoxin production.

Example III

The fermentation was repeated using organism B. The following basal medium composition was used with varied sucrose additions:

| | Percent |
|---|---|
| Technical casein | 4.0 |
| Corn steep liquor | 1.0 |
| $(NH_4)_2HPO_4$ | 0.2 |
| $MgSO_4 \cdot 7H_2O$ | 0.05 |
| $FeSO_4$ | 0.001 |
| $MnCl_2$ | 0.001 |
| pH 7.5. | |

| Sucrose (percent): | Exotoxin (mg./ml.) |
|---|---|
| 2 | 4.4 |
| 4 | 6.9 |
| 6 | 7.9 |
| 8 | 9.6 |
| 10 | 9.12 |
| 12 | 9.8 |

Sporulation was less than $10^9$/ml. in all cases. Results indicate that optimum sucrose content is 8 to 12%.

Example IV

The process of Example III was repeated except 10% sucrose was used and the amount of protein and source of protein were varied.

| Protein sources | Percent | Exotoxin, mg./ml. |
| --- | --- | --- |
| Fish meal | 2 | 3.4 |
| Do | 4 | 6.9 |
| Do | 6 | 11.3 |
| Skim milk powder | 2 | 3.6 |
| Do | 4 | 5.5 |
| Do | 6 | 11.3 |
| Do | 8 | 5.8 |
| Technical casein | 4 | 11.5 |
| Do | 4.5 | 13.9 |
| Do | 5.0 | 15.8 |
| Do | 5.5 | 17.8 |
| Do | 6.0 | 13.9 |
| Enzyme hydrolyzed casein | 3 | 7.2 |
| Do | 4 | 8.6 |
| Do | 5 | 9.6 |
| Do | 6 | 8.9 |

Example V

The process of Example IV was repeated except that a combination of technical casein and fish meal was used as protein source.

| Technical casein, percent | Fish meal, percent | Spores/ml.×$10^5$ | Exotoxin, mg./ml. |
| --- | --- | --- | --- |
| 4 | 1 | 0.9 | 10.0 |
| 3 | 2 | 2.1 | 10.0 |
| 2 | 4 | 2.9 | 11.3 |
| 2 | 5 | 3.1 | 10.8 |

Example VI

The medium used in Example III with 10% sucrose was inoculated with organism B in 150 gallon fermenter. After 64 hours, exotoxin yield in culture filtrate was 8.6 mg./ml.

Example VII

A fermentation medium was inoculated with organism B. After 64 hours, the culture filtrate contained 4.4 mg./ml. of exotoxin. One hundred ml. of filtrate was treated by admixing 1.5 to 3% of $CaCl_2$ and the pH was adjusted to 6.0 to 7.5. The precipitate was dried to a powder which contained 15% exotoxin. The medium composition was:

| | Percent |
| --- | --- |
| Sucrose | 8.0 |
| Technical casein | 1.5 |
| Corn steep liquor | 4.0 |
| $(NH_4)_2HPO_4$ | 0.5 |
| $K_2HPO_4$ | 0.5 |
| $KH_2PO_4$ | 0.5 | pH 7.5.

Example VIII

One hundred ml. of medium was inoculated with organism B. After 64 hours of fermentation, the filtrate contained 7.32 mg./ml. exotoxin; 320 mg. exotoxin was recovered from the culture filtrate according to the process described in Example VII. To the cell cream, 50 ml. $H_2O$ was added and the slurry heated in a boiling water bath for 30 minutes. The exotoxin in the filtrate was recovered as in Example VII. The combined dry powder contained 40% exotoxin. The medium was:

| | Percent |
| --- | --- |
| Sucrose | 8.0 |
| MSG | 4.0 |
| Methionine | 0.3 |
| Glycine | 0.3 |
| $NH_4Cl$ | 0.2 |
| $K_2HPO_4$ | 1.0 |
| $MgSO_4 \cdot 7H_2O$ | 0.005 |
| $MnCl_2$ | 0.001 |
| $FeSO_4$ | 0.001 | pH 7.5.

Example IX

The process was repeated using organism B to illustrate the use of starch as a carbohydrate source. The basal medium containing 8% carbohydrate, technical casein, fish meal, and corn steep liquor in the amounts indicated, and further included $(NH_4)_2HPO_4$ in the amount of 0.2%; $MgSO_4 \cdot 7H_2O$ in the amount of 0.05%; $FeSO_4$ in the amount of 0.001% and $MnCl_2$ in the amount of 0.001%. The fermentation was carried out using 50 ml. of medium in a 500 ml. shaker flask at pH of 7.5 and for a period of 64 hours. The results were as follows:

| Technical casein, percent | Fish meal, percent | Corn steep liquors, percent | Exotoxin, mg./ml. Sucrose | Exotoxin, mg./ml. Starch |
| --- | --- | --- | --- | --- |
| 5.5 | | 1 | 12.72 | 7.20 |
| 3.0 | 2.0 | 1 | 12.24 | 11.28 |
| 2.0 | 3.0 | 1 | 9.28 | 10.56 |
| 1.0 | 3.0 | 3 | 5.28 | 7.20 |
| 2.0 | 3.0 | 3 | 4.56 | 6.96 |

The water-soluble, heat-stable exotoxin is employed in insecticidal compositions containing an effective amount of the exotoxin and a carrier. The carrier may be any suitable inorganic or organic liquid, semi-solid or solid. Suitable liquid carriers include, without limitation, water, mineral oils, vegetable oils, such as coconut oil, pine oil, and the like, naphthenes, naphthas, kerosenes, gasolines, isoparaffins, benzene, xylenes, and the like, and mixtures thereof. Such liquid compositions may be in the form of solutions of the exotoxin in the carrier or emulsions in which either the aqueous or organic phase is the continuous phase. Suitable solid carriers include bacterial cells and other vegetative debris from the final whole culture, clays, silica, talc, mica, calcium carbonate, sawdust, ground phosphate rock, diatomaceous earth and the like, and mixtures thereof. Compositions prepared from the exotoxin also may contain supplemental materials such as attractants, thickeners, oxidation inhibitors, dispersing aids, emulsifiers, and the like. The concentration of the exotoxin in such compositions will vary over a relatively wide range and generally is in the range of from about 0.01% to about 5% by weight.

What is claimed is:

1. The method of producing Bacillus thuringiensis exotoxin comprising culturing an acrystalliferous mutant of Bacillus thuringensis var. thuringiensis in a nutritionally sufficient aqueous medium containing carbohydrate in an amount sufficient to suppress sporulation over a period of at least 48 hours, said carbohydrate being present in the amount of about 6% to about 12% by weight of the medium, maintaining said culture at a temperature in the range of 20° to 40° C. and at a pH in the range of 6 to 8 for a period of at least about 40 hours, and recovering an exotoxin-containing product.

2. The method in accordance with claim 1 in which the carbohydrate comprises sucrose.

3. The method in accordance with claim 1 in which the carbohydrate comprises starch.

4. The method in accordance with claim 1 in which the medium contains technical casein in the amount of 2 to 6% by weight of the medium.

5. The method in accordance with claim 1 in which the medium contains glutamic acid or an alkali metal salt thereof in the amount of 2 to 6% by weight of the medium.

6. The method in accordance with claim 4 in which sporulation is maintained at a level below $10^8$ spores per ml. over a period of 48 hours and in which said fermentation is carried out for at least 48 hours.

7. The method in accordance with claim 4 in which said sporulation is maintained at a level below $10^8$ spores per ml. throughout the fermentation.

8. The method in accordance with claim 1 in which said mutant is NRRL B–3937.

9. The method in accordance with claim 8 in which the carbohydrate comprises sucrose.

10. The method in accordance with claim 8 in which the carbohydrate comprises starch.

11. The method in accordance with claim 8 in which the medium contains technical casein in the amount of 2 to 6% by weight of the medium.

12. The method in accordance with claim 9 in which the medium contains technical casein in the amount of 2 to 6% by weight of the medium.

13. The method in accordance with claim 9 in which the medium contains glutamic acid or an alkali metal salt thereof in the amount of 2 to 6% by weight of the medium.

14. The method in accordance with claim 12 in which sporulation is maintained at a level below $10^8$ spores per ml. over a period of 48 hours and in which said fermentation is carried out for at least 48 hours.

15. The method in accordance with claim 12 in which said sporulation is maintained at a level below $10^8$ spores per ml. throughout the fermentation.

References Cited
UNITED STATES PATENTS 3,190,811   6/1965   Molander _____ 195—96

ALVIN E. TANENHOLTZ, Primary Examiner

U.S. Cl. X.R.

424—95, 253